US008740094B2

(12) United States Patent
Schützmann et al.

(10) Patent No.: US 8,740,094 B2
(45) Date of Patent: Jun. 3, 2014

(54) SECURITY ELEMENT FOR PROTECTING DOCUMENTS OF VALUE

(75) Inventors: Jürgen Schützmann, Pfaffenhofen (DE); Manfred Heim, Bad Tölz (DE); Dieter Stein, Holzkirchen (DE); Friedrich Kretschmar, München (DE)

(73) Assignee: Giesecke & Devrient GmbH, Munich (DE)

( * ) Notice: Subject to any disclaimer, the term of this patent is extended or adjusted under 35 U.S.C. 154(b) by 197 days.

(21) Appl. No.: 12/515,903

(22) PCT Filed: Nov. 21, 2007

(86) PCT No.: PCT/EP2007/010082
§ 371 (c)(1), (2), (4) Date: May 21, 2009

(87) PCT Pub. No.: WO2008/061729
PCT Pub. Date: May 29, 2008

(65) Prior Publication Data

US 2010/0065639 A1 Mar. 18, 2010

(30) Foreign Application Priority Data

Nov. 22, 2006 (DE) ........................ 10 2006 055 170

(51) Int. Cl.
*G06K 19/06* (2006.01)

(52) U.S. Cl.
USPC .......................................... 235/493; 235/449

(58) Field of Classification Search
USPC ................................. 235/449, 450, 487, 493
See application file for complete search history.

(56) References Cited

U.S. PATENT DOCUMENTS

| | | | | |
|---|---|---|---|---|
| 5,255,129 | A * | 10/1993 | Jones | 360/40 |
| 5,736,722 | A * | 4/1998 | Chamberlain, IV | 235/449 |
| 5,764,054 | A * | 6/1998 | Chamberlain, IV | 324/235 |
| 5,889,271 | A * | 3/1999 | Webb | 235/462.01 |
| 6,255,948 | B1 * | 7/2001 | Wolpert et al. | 340/572.8 |

(Continued)

FOREIGN PATENT DOCUMENTS

| | | | |
|---|---|---|---|
| DE | 19921653 | A1 | 9/2000 |
| EP | 0413534 | A1 | 2/1991 |

(Continued)

OTHER PUBLICATIONS

Search Report of German Patent Office regarding German Patent Application No. 10 2006 055 170.2, Jul. 27, 2007.

(Continued)

*Primary Examiner* — Paultep Savusdiphol
(74) *Attorney, Agent, or Firm* — Workman Nydegger

(57) ABSTRACT

The invention relates to a security element for protecting documents of value, which has magnetic material. A portion of a magnetic coding is arranged on the security element, which coding consists of several magnetic areas and several gap areas. The portion of the magnetic coding is arranged in a predetermined direction along the security element, for example perpendicularly to a transport direction of the security element or document of value through a magnet sensor. Concerning the length of the magnetic areas and of the gap areas of the magnetic coding, certain length conditions are predetermined, which are chosen in dependence on the magnet sensor employed.

21 Claims, 4 Drawing Sheets

(56) References Cited

U.S. PATENT DOCUMENTS

Figure 1:
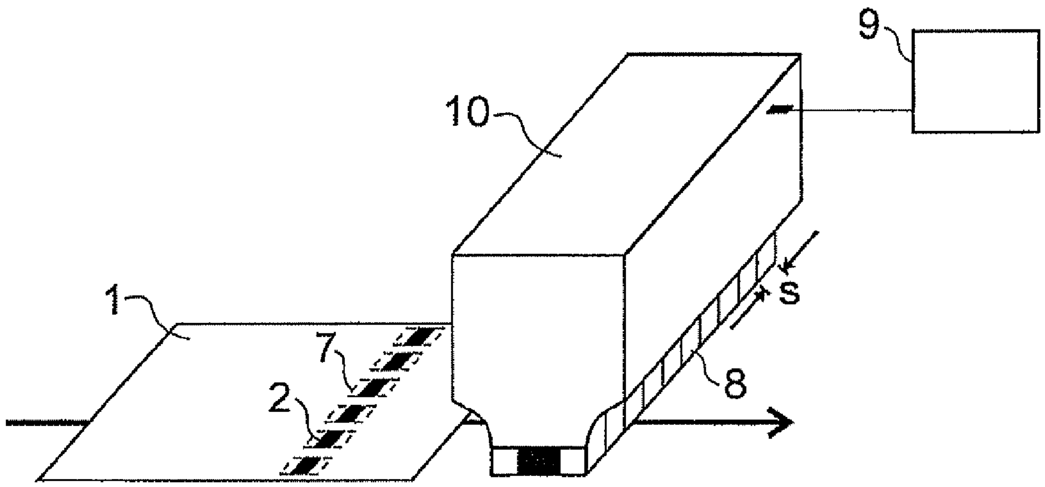

| | | | | |
|---|---|---|---|---|
| 6,343,745 | B1 * | 2/2002 | Bohm et al. | 235/493 |
| 6,454,166 | B1 * | 9/2002 | Stenzel et al. | 235/449 |
| 6,491,324 | B1 * | 12/2002 | Schmitz et al. | 283/82 |
| 7,063,257 | B2 * | 6/2006 | Buttifant et al. | 235/449 |
| RE39,490 | E * | 2/2007 | Cote et al. | 340/572.8 |
| 7,434,732 | B2 * | 10/2008 | Buttifant et al. | 235/449 |
| 7,516,893 | B2 * | 4/2009 | Buttifant et al. | 235/449 |
| 2002/0056758 | A1 * | 5/2002 | Stenzel et al. | 235/493 |
| 2004/0046023 | A1 * | 3/2004 | Buttifant et al. | 235/449 |
| 2006/0186203 | A1 * | 8/2006 | Buttifant et al. | 235/450 |
| 2006/0208078 | A1 * | 9/2006 | Buttifant et al. | 235/449 |
| 2007/0095630 | A1 * | 5/2007 | Mennie et al. | 194/206 |

FOREIGN PATENT DOCUMENTS

| | | | |
|---|---|---|---|
| EP | 0407550 | B1 | 10/1994 |
| EP | 1221679 | A1 | 7/2002 |
| GB | 2098768 | A | 11/1982 |
| WO | 9008367 | A1 | 7/1990 |

OTHER PUBLICATIONS

International Search Report in PCT/EP2007/010082, Mar. 6, 2008.

* cited by examiner

SECURITY ELEMENT FOR PROTECTING DOCUMENTS OF VALUE

The invention relates to a security element for protecting documents of value. The invention furthermore relates to a document of value and a foil material with security element, an assortment of documents of value, a system of document of value and magnet sensor and a method for checking the security element or the document of value.

Documents of value within the terms of the invention can be bank notes, but also share certificates, deeds, stamps, checks, admission tickets, tickets, flight tickets, identity cards, visa stickers and the like as well as labels, seals, packagings, security paper or other elements for the product protection. The simplifying designation document of value will hereinafter therefore always include documents of the stated type.

It is known that for example bank notes have magnetic material, which is used for the verification of the authenticity of the bank notes. Such magnetic material is for example a component of printing inks and is applied on the bank notes during the printing of the bank notes. For checking the authenticity of the bank notes the distribution of the magnetic material produced in the printing can be determined and can be compared to a specified value. It is furthermore known that magnetic material can be contained in security elements applied on the bank note. Thus for example security threads can have magnetic material, which can be applied either continuously or in the form of a coding.

A certain sequence of magnetic and non-magnetic areas, which is characteristic of the document of value to be protected, for example serves for magnetically coding a security thread. The codings known so far (e.g. EP 0 407 550 B1) consist of individual bits, which either contain magnetic material or do not contain magnetic material. With a dimension of only 2 mm the individual bits have only a relatively small lengthwise extension along the security thread. To be able to detect every single of these magnetic bits and therewith the coding, magnetic sensors with a high spatial resolution, having measuring tracks of a correspondingly small track width, are required in the case of a lengthwise transport of bank notes. However, the use of such magnet sensors for the automatic detection of a magnetic coding has a disadvantage insofar that a substantial economic effort is involved in replacing a high number of magnetic sensors with a low spatial resolution already installed in customers' devices by new magnetic sensors with a high spatial resolution.

The invention is therefore based on the problem of improving the protection of documents of value through security elements with magnetic coding, wherein less effort is to be involved in the introduction of security elements with magnetic coding than has been possible with magnetic codings so far.

This problem is solved by the features of the independent claims. Developments are subject of the subclaims.

In order to solve this problem the already existing magnet sensors are furthermore employed to detect the magnetic properties of the security elements of documents of value. A further measure is that a magnetic coding is specified for the security elements of the documents of value, which coding can be detected clearly also by magnet sensors whose measuring tracks have a relatively broad track width. For this purpose the security elements have a magnetic coding which is chosen in dependence on the track width of the magnet sensor. This magnetic coding is respectively characteristic of the document of value to be protected, for example for the type of document of value. In the case of bank notes the magnetic coding can for example be chosen to be characteristic of the denomination of the bank note.

The magnetic coding has at least one magnetic area with magnetic material and at least one gap area which does not contain any magnetic material or which has a lower remanent flux density than the magnetic area. The at least one magnetic area and the at least one gap area are arranged along a predetermined direction, which extends for example along a lengthwise direction of the security element. The inventive security element has a portion of a magnetic coding which is arranged along the security element, for example on or within the security element, and which has approximately the length of the security element. At least one of the gap areas of the magnetic coding has a first length L1 in the predetermined direction and at least one of the magnetic areas of the magnetic coding has a second length L2 in the predetermined direction. For L1 and L2 at least one of the following length conditions a-j is valid, wherein by the parameter s the track width of the magnet sensor used for detecting the coding is taken account of:

a) $1.8s \leq L1 < 3s$ and $0 < L2 \leq s$, or
b) $1.8s \leq L1 < 3s$ and $2s < L2$, or
c) $3.8s \leq L1$ and $0 < L2$,
or
d) $1.8s \leq L1 < 3s$ and $0 < L2 \leq 2s$, or
e) $1.8s \leq L1 < 3s$ and $3s < L2$, or
f) $3.8s \leq L1$ and $0 < L2$,
or
g) $2.8s \leq L1 < 4s$ and $0 < L2 \leq s$, or
h) $2.8s \leq L1 < 4s$ and $2s < L2$,
or
i) $2.8s \leq L1 < 4s$ and $0 < L2 \leq 2s$, or
j) $2.8s \leq L1 < 4s$ and $3s < L2$.

The above-stated length conditions a-j or the corresponding codings a-j, are adapted to the magnet sensor used. To distinguish these codings with the aid of the magnet sensor, each magnetic track is evaluated in view of whether this magnetic track detects a magnetic signal (high bit) or no magnetic signal (low-bit) from the security element transported past. On the basis of these data it is determined how many adjacent magnetic tracks of the magnet sensor detect a high bit and how many detect a low bit. If for example a security element with a coding which fulfills the length condition a is transported past, the number of adjacent high bits is 1 or 2, and the number of adjacent low bits is also 1 or 2. Which one of the two possible values really results depends on the length and on the position of the magnetic areas and gap areas on the security element and on the position of the security element in relation to the tracks of the magnet sensor. Within a group of codings (a-c or d-f or g-h or i-j) the respective coding can subsequently be detected unambiguously on the basis of the number of adjacent low bits and the number of adjacent high bits.

In practice it has turned out that the lower limit for L1 can respectively lie some percent below the calculatory minimum value. For example in the case of the length condition a the calculated minimum value for L1 would be 2s, in order to be able to detect at least one gap area securely. However, in practice also slightly shorter gap areas can be securely identified as a gap.

In the case of a track width s of the magnet sensor of for example 9 mm the following length conditions result for L1 and L2:

a) 16 mm $\leq L1 <$ 27 mm and $0 < L2 \leq$ 9 mm, or
b) 16 mm $\leq L1 <$ 27 mm and 18 mm $< L2$, or
c) 34 mm $\leq L1$ and $0 < L2$, or d) $16\text{ mm} \leq L1 < 27\text{ mm}$ and $0 < L2 \leq 18\text{ mm}$, or e) $16\text{ mm} \leq L1 < 27\text{ mm}$ and $27\text{ mm} < L2$, or f) $34\text{ mm} \leq L1$ and $0 < L2$, or g) $25\text{ mm} \leq L1 < 36\text{ mm}$ and $0 < L2 \leq 9\text{ mm}$, or h) $25\text{ mm} \leq L1 < 36\text{ mm}$ and $18\text{ mm} < L2$, or i) $25\text{ mm} \leq L1 < 36\text{ mm}$ and $0 < L2 \leq 18\text{ mm}$, or j) $25\text{ mm} \leq L1 < 36\text{ mm}$ and $27\text{ mm} < L2$.

In one embodiment each of the gap areas of the magnetic coding has a length in the predetermined direction which fulfills the length condition (a-j) valid for the first length L1. In addition, each of the magnetic areas of the magnetic coding can have a length in the predetermined direction which fulfills the length condition valid for the second length L2. In a special embodiment each of the gap areas of the magnetic coding has the first length L1 and/or each of the magnetic areas of the magnetic coding has the second length L2. For example the magnetic coding can consist of a periodically repeated sequence of at least one of the gap areas and at least one of the magnetic areas.

Preferably the magnetic areas have a length of more than 2 mm, preferably of at least 3 mm, in the predetermined direction. For example the gaps and/or the magnetic areas extend over the complete width of the security element. The magnetic areas continuously can have magnetic material in the predetermined direction. However, alternatively also one or several interruptions can be arranged within the magnetic areas, which interruptions do not contain any magnetic material or have a lower remanent flux density than the magnetic areas. As opposed to the gap areas these interruptions have a length in the predetermined direction which is smaller than the track width s, thus for example a length of less than 9 mm. In the case that the interruptions are of a sufficiently small length, these are not mistaken for a gap area, since the magnet sensor with a track width s does not recognize such short interruptions as interruptions of the magnetic area. If within one magnetic area one or several such short interruptions are arranged, the length of the magnetic area, which has to be compared to the length conditions a-j, is to be understood respectively as the total length of the magnetic area with interruptions, consequently including the length of one or several interruptions arranged within the respective magnetic area.

In order to implement a lower remanent flux density in the gap areas and/or in the interruptions, in the gap areas and/or in the interruptions for example a concentration of the magnetic material can be selected that is lower than in the magnetic areas. Alternatively or additionally it is also possible that in the gap areas and/or in the interruptions a smaller layer thickness of the magnetic material, a smaller width of the applied magnetic material or also a different magnetic material is applied than in the magnetic areas. In the gap areas and/or in the interruptions the remanent flux density and/or the concentration of the magnetic material and/or the layer thickness of the magnetic material and/or the width of the applied magnetic material can amount to for example less than 50%, in particular less than 10% of the remanent flux density and/or of the concentration of the magnetic material and/or the layer thickness of the magnetic material and/or of the width of the applied magnetic material in the magnetic areas. The magnetic material can have soft magnetic material, in particular iron powder or spherical iron particles, or hard magnetic material, preferably iron or at least an iron compound, in particular iron oxide.

In a special embodiment at least one alphanumeric character, symbol or pattern is arranged in at least one of the gaps and/or at least one of the magnetic areas and/or in at least one of the interruptions. Information about the type of document of value to be protected can be contained therein, in the case of bank notes for example on the denomination, the currency, etc. The alphanumeric character, symbol or pattern can be implemented in the form of a recess in one layer of the security element, for example in a non-magnetic area of the security element. The security element can be a security thread, but it can also be an applied security strip or a self-supporting element, a patch or a label, which, after its production, is firmly connected to the object to be protected.

The security element can either be produced directly on the document of value or can be prepared on a separate substrate. In the case that it would be difficult for example to provide the document of value directly with the magnetic materials, it may be expedient to prepare the structure of the security element at least partially on the separate substrate. The separate substrate on which the security element can be applied, preferably has plastic and can for example be or have a foil material, in particular a transfer material.

The security element, such as for example a security thread, can be applied on a carrier material of the transfer material in endless form. The fastening of the security element on a document of value to be protected is effected with the aid of an adhesive layer, which either is applied on the document of value or also on the topmost layer of the transfer material. Preferably, for this a hot melting adhesive is used. In order to determine the contour form of the security element, there either can be provided an adhesive layer only in the areas to be transferred, or the adhesive is activated only in the areas to be transferred. After the transfer the carrier material of the transfer material is stripped off and only the security element remains on the document of value to be protected.

The document of value, on which or in which the security element is applied or integrated, can be a product packaging or at least a part of a product packaging or a security document, for example a bank note, or a security paper, for example for bank notes. Other objects of value, for which a protection in terms of security is required, of course can also be provided with the security element according to the invention.

The magnetic coding is respectively characteristic of the type of document of value to be detected. Therefore the magnetic coding can be used for the automatic detection and for the clear distinction between different types of documents of value. An assortment of documents of value according to the invention comprises documents of value of several types. In the case of bank notes the type of documents of value which can be detected automatically can for example be the denomination and/or the currency of the bank notes. Several documents of value of the same type each have at least one security element with the same magnetic coding. The security elements of the documents of value of the same type can be identical, but do not necessarily have to be identical. Merely the length condition to be fulfilled, or the coding of the security elements of documents of value of the same type is the same.

To a first inventive assortment belongs at least one document of value of a first type, which has at least one first inventive security element for example arranged on or within the document of value. The first security element has at least one portion of a first magnetic coding arranged along the first security element. The gap areas and magnetic areas of the first magnetic coding are chosen in such a way that the first length L1 of the first magnetic coding and the second length L2 of the first magnetic coding fulfill one first of the above-mentioned length conditions a or b or c. To the first inventive assortment furthermore belongs at least one document of value of a second type, which document has at least one second inventive security element, which is for example arranged on or within the document of value. The second security element has at least one portion of a second magnetic coding arranged along the second security element. The gap areas and magnetic areas of the second magnetic coding are chosen in such a way that the first length L1 of the second magnetic coding and the second length L2 of the second magnetic coding fulfill one second of the above-mentioned length conditions a or b or c, which differs from the first length condition. Furthermore, the first inventive assortment can have at least one document of value of a third type, which document has at least one third inventive security element, arranged for example on or within the document of value. The third security element has at least one portion of a third magnetic coding arranged along the third security element. The gap areas and magnetic areas of the third magnetic coding are chosen in such a way that the first length L1 of the third magnetic coding and the second length L2 of the third magnetic coding fulfill one third of the above-mentioned length conditions a or b or c, which differs from the first and from the second length condition.

To a second inventive assortment, which has to be regarded as an alternative to the first inventive assortment, belongs at least one document of value of a fourth type, having at least one fourth inventive security element arranged for example on or within the document of value. The fourth security element has at least one portion of a fourth magnetic coding arranged along the fourth security element. The gap areas and magnetic areas of the fourth magnetic coding are chosen in such a way that the first length L1 of the fourth magnetic coding and the second length L2 of the fourth magnetic coding fulfill one fourth of the above-mentioned length conditions d or e or f. To the second inventive assortment furthermore belongs at least one document of value of a fifth type, which document has at least one fifth inventive security element arranged for example on or within the document of value. The fifth security element has at least one portion of a fifth magnetic coding arranged along the fifth security element. The gap areas and magnetic areas of the fifth magnetic coding are chosen in such a way that the first length L1 of the fifth magnetic coding and the second length L2 of the fifth magnetic coding fulfill one fifth of the above-mentioned length conditions d or e or f, which differs from the fourth length condition. Furthermore, the second assortment can have at least one document of value of a sixth type, which document has at least one sixth inventive security element arranged for example on or within the document of value. The sixth security element has at least one portion of a sixth magnetic coding arranged along the sixth security element. The gap areas and magnetic areas of the sixth magnetic coding are chosen in such a way that the first length L1 of the sixth magnetic coding and the second length L2 of the sixth magnetic coding fulfill one sixth of the above-mentioned length conditions d or e or f, which differs from the fourth and from the fifth length condition.

To a third inventive assortment, which has to be regarded as an alternative to the first and the second inventive assortment, belongs at least one document of value of a seventh type, having at least one seventh inventive security element arranged for example on or within the document of value. The seventh security element has at least one portion of a seventh magnetic coding arranged along the seventh security element. The gap areas and magnetic areas of the seventh magnetic coding are chosen in such a way that the first length L1 of the seventh magnetic coding and the second length L2 of the seventh magnetic coding fulfill one seventh of the above-mentioned length conditions g or h. To the third inventive assortment furthermore belongs at least one document of value of an eighth type, which document has at least one eighth inventive security element arranged for example on or within the document of value. The eighth security element has at least one portion of an eighth magnetic coding arranged along the eighth security element. The gap areas and magnetic areas of the eighth magnetic coding are chosen in such a way that the first length L1 of the eighth magnetic coding and the second length L2 of the eighth magnetic coding fulfill one eighth of the above-mentioned length conditions g or h, which differs from the seventh length condition.

To a fourth inventive assortment, which has to be regarded as an alternative to the first, the second and the third inventive assortment, belongs at least one document of value of a ninth type, having at least one ninth inventive security element arranged for example on or within the document of value. The ninth security element has at least one portion of a ninth magnetic coding arranged along the ninth security element. The gap areas and magnetic areas of the ninth magnetic coding are chosen in such a way that the first length L1 of the ninth magnetic coding and the second length L2 of the ninth magnetic coding fulfill one ninth of the above-mentioned length conditions i or j. To the fourth inventive assortment furthermore belongs at least one document of value of a tenth type, which document has at least one tenth inventive security element arranged for example on or within the document of value. The tenth security element has at least one portion of a tenth magnetic coding arranged along the tenth security element. The gap areas and magnetic areas of the tenth magnetic coding are chosen in such a way that the first length L1 of the tenth magnetic coding and the second length L2 of the tenth magnetic coding fulfill one tenth of the above-mentioned length conditions i or j, which differs from the ninth length condition.

To all inventive assortments further documents of value can also belong to, having at least one security element with magnetic properties which does not have a portion of one of the magnetic codings a-j, but which continuously has magnetic material in the predetermined direction. Within the magnetic material applied or integrated continuously, also interruptions can be arranged, which in the predetermined direction are shorter than the track width s of the magnet sensor.

The documents of value of the inventive assortments are for example bank notes or security paper for bank notes. The type of document of value can be the denomination and/or the currency of the bank notes. The inventive assortment can for example comprise bank notes of several denominations belonging to one currency.

To enable the detection of security elements with the inventive magnetic coding, sensors for checking the inventive coding are required in addition to the documents of value equipped with the inventive security elements. Both components belong together and form an inventive system. The inventive system has at least one magnet sensor having several measuring tracks which have perpendicularly to the transport direction a respective track width s. The system furthermore has at least one inventive document of value, which is transported past the magnet sensor along a transport direction, wherein the document of value has at least one inventive security element with at least one portion of at least one magnetic coding, of which at least one magnetic area and at least one gap area fulfills at least one of the above-mentioned length conditions a-j.

For checking a document of value having at least one inventive security element, the document of value is transported past a magnet sensor for measuring the magnetic properties of the security element, and the magnetic signals of the inventive security element are recorded with the aid of the magnet sensor. A magnetic coding is determined on the basis of the magnetic signals of the security element transported past. For determining the magnetic coding it is established for the individual magnetic tracks of the magnet sensor whether or not these detect a magnetic signal generated by the security element transported past. It is furthermore determined how many adjacent magnetic tracks of the magnet sensor detect magnetic signals and how many do not detect magnetic signals. Subsequently the respective coding within a group of codings (a-c or d-f or g-h or i-j) is unambiguously determined on the basis of the number of adjacent magnetic tracks detecting magnetic signals and the number of adjacent magnetic tracks not detecting magnetic signals. The document of value is transported past the magnet sensor transversely to the longitudinal direction of the security element, in particular perpendicularly to the longitudinal direction of the security element.

Further advantages and embodiments of the invention are explained in more detail with reference to the Figures. The invention will be explained in greater detail by the example of a bank note. But it is obvious that the invention can be used without any problems for the above-mentioned documents of value.

Figure 2A:
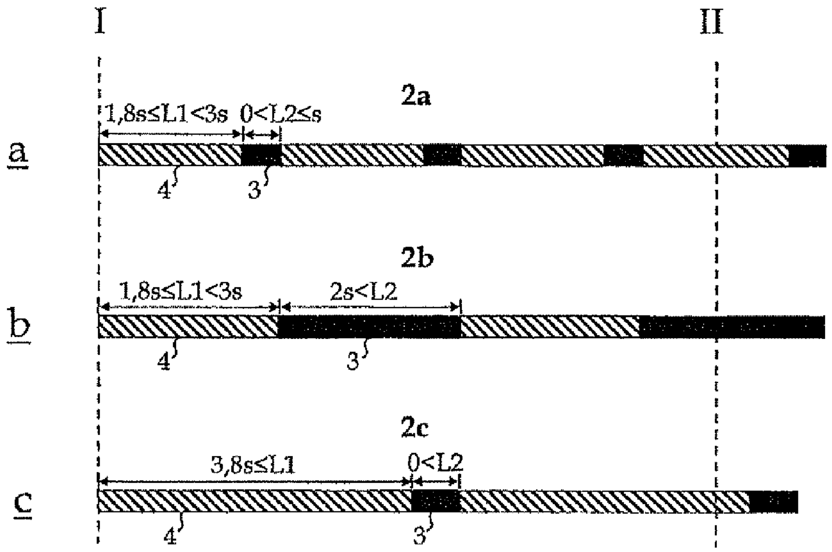
Figure 2B:
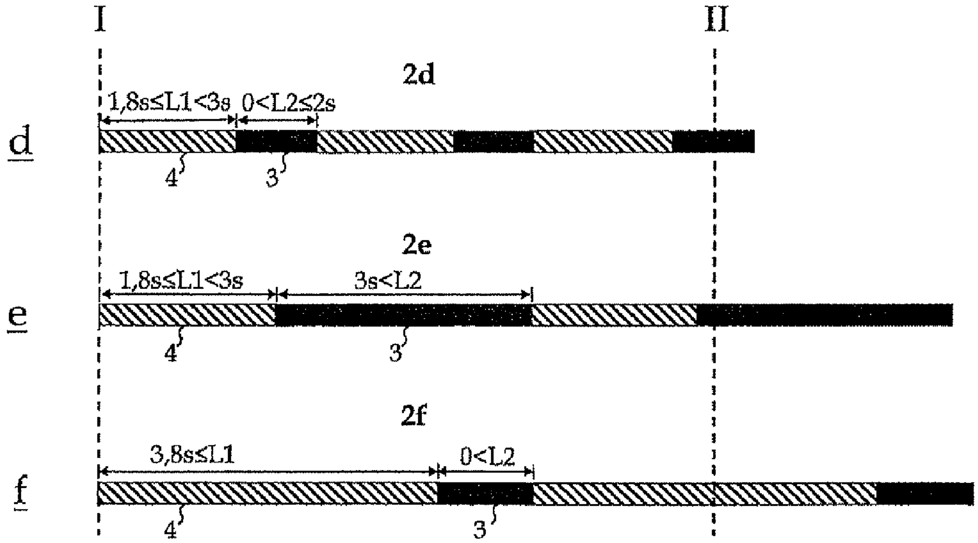
Figure 2C:
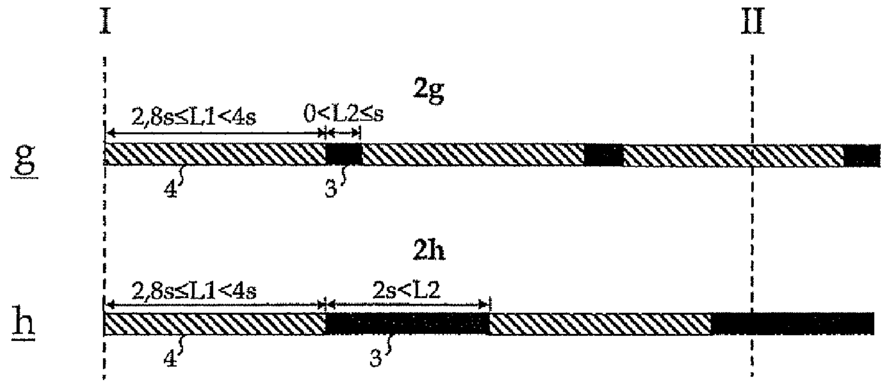
Figure 2D:
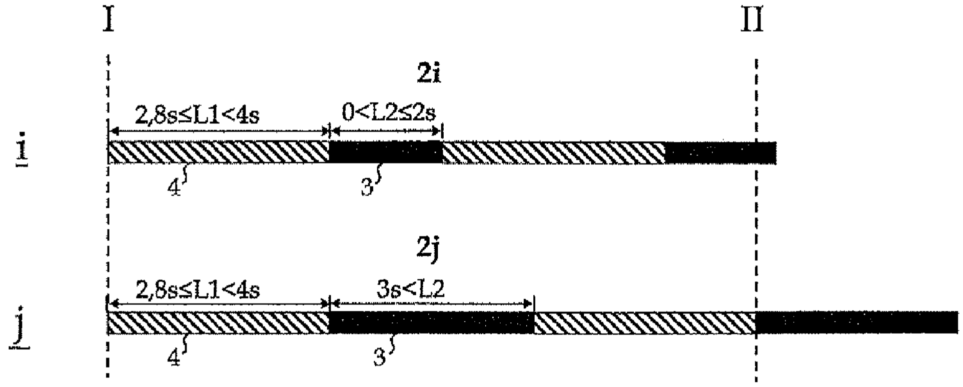
Figure 2E:
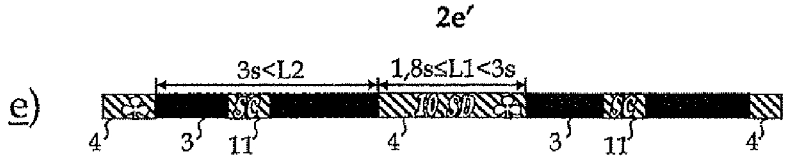
Figure 3A:
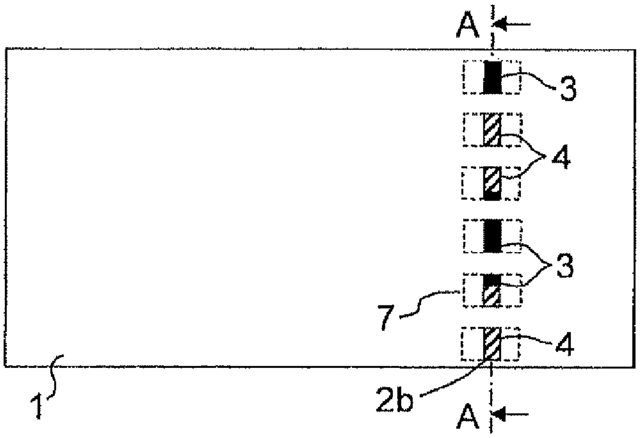
Figure 3B:
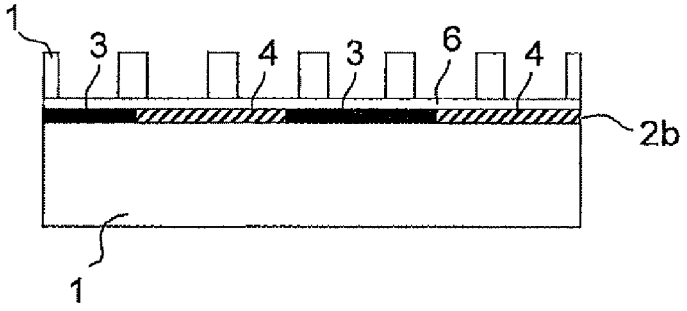
Figure 3C:
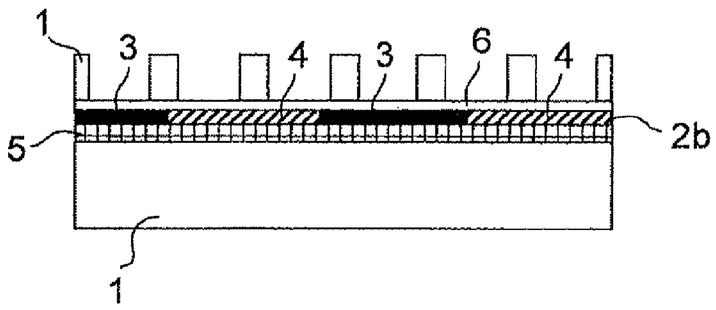

The figures are described as follows:

FIG. 1 a schematically represented arrangement of a magnet sensor and one bank note transported past the magnet sensor with an inventive security element (magnetic areas and gap areas not shown), FIG. 2*a* three exemplary security elements 2*a*, 2*b*, 2*c*, each having a portion of a coding of gap areas (hatched) and magnetic areas (black) for which respectively one of the length conditions a, b, c is valid, FIG. 2*b* three exemplary security elements 2*d*, 2*e*, 2*f*, each having a portion of a coding of gap areas (hatched) and magnetic areas (black) for which respectively one of the length conditions d, e, f is valid, FIG. 2*c* two exemplary security elements 2*g*, 2*h*, each having a portion of a coding of gap areas (hatched) and magnetic areas (black) for which respectively one of the length conditions g, h is valid, FIG. 2*d* two exemplary security elements 2*i*, 2*j*, each having a portion of a coding of gap areas (hatched) and magnetic areas (black) for which respectively one of the length conditions i, j is valid, FIG. 2*e* an exemplary security element 2*e*', having a portion of a coding of gap areas (hatched) and magnetic areas (black) for which the length condition e is valid, and which has interruptions of the magnetic areas as well as characters and symbols, FIG. 3*a-c* an exemplary embodiment of a bank note with the security element 2*b* (FIG. 3*a*), as well as exemplary embodiments of the security element along the line A-A in cross section (FIGS. 3*b*, 3*c*).

In FIG. 1 a detail of a device for checking bank notes for their magnetic properties is shown schematically. Bank notes 1 or security elements 2 to be checked are transported through the device along the transport direction indicated by the arrow in FIG. 1 by a not shown transport system. In the shown example a bank note 1 is transported in a lengthwise transport past a magnet sensor 10 functioning for example inductively or magneto-resistively. Therein the security element 2, which is arranged with its longitudinal direction approximately perpendicularly to the transport direction of the bank note 1, is checked for its magnetic properties. The security element 2 is for example a security thread which is partially embedded in the bank-note substrate and only comes to its surface or is visible on its surface in windows 7.

The magnet sensor 10 has several measuring tracks 8 each having a track width s perpendicular to the transport direction of the bank note. In the shown example the magnet sensor 10 has ten measuring tracks 8 whose track width s amounts to 9 mm each. On the individual measuring tracks 8 of the magnet sensor 10 a magnetic signal is respectively detected upon transporting past the bank note 1, which signal allows inferring the magnetic properties of the security element 2 in the detection range of the individual measuring track. The magnetic signals are transmitted by the magnet sensor 10 to an evaluation device 9, which further processes and evaluates the magnetic signals of the individual measuring tracks. For the purpose of evaluation, the magnetic coding, a portion of which is comprised by the security element, is determined on the basis of the number of adjacent magnetic tracks with or without magnetic signals. The information about the result of the evaluation of each individual bank note 1 is subsequently stored and passed on for further processing.

In FIG. 2*a* three exemplary security elements 2*a*, 2*h*, 2*c* are shown, each of which having a portion of respectively one of the magnetic codings a, b, c. In this embodiment respectively one of the three length conditions a, b, c is valid for each magnetic area and gap area of the magnetic codings a, b, c. The security element 2*a* with the magnetic coding a for example has a periodical arrangement of gap areas (hatched) and magnetic areas (black), wherein the period in this case consists of a gap area of a first length L1 (with $1.8s \leq L1 < 3s$) and a magnetic area with a second length L2 (with $0 < L2 \leq s$). Of the coding a four periods are shown by way of example, of the codings b and c two periods each. The security element 2*a* has a portion of the coding a, which—depending on the chosen extension of the security element 2*a* and depending on the choice of the lengths L1 and L2 within the length condition a—contains one or several periods of the coding a. This is correspondingly valid for the security element 2*b* with the coding b and the security element 2*c* with the coding c and for all codings specified in the following.

On the two edges of the security elements 2*a*, 2*b*, 2*c* viewed in a longitudinal direction, there are generally cut-off gap areas or magnetic areas of the respective coding, thus gap areas or magnetic areas which are not present on the respective security element in their entirety. However, the edge of the security elements 2*a*, 2*b*, 2*c* can also coincide with the edge of a gap area or magnetic area by chance. For the purpose of a better comparison of lengths the portions of the codings a, b, c for the security elements 2*a*, 2*b*, 2*c* are chosen by way of example in such a way that this is the case on the left edge (intersection of the security elements with the dashed line I) of the security elements 2*a*, 2*b*, 2*c*. However, the security elements 2*a*, 2*b*, 2*c* are by no means limited to this special case. On the right side the end of the security elements 2*a*, 2*b*, 2*c* is marked by the dashed line II. In the shown example all three security elements 2*a*, 2*b*, 2*c* are of equal length. However, it is equally possible to choose security elements 2*a*, 2*b*, 2*c* of different lengths. On the right edge the security elements 2*a* and 2*c* each have a cut-off gap area and the security element 2*b* a cut-off magnetic area.

With the codings a, b, c in FIG. 2*a* a group of codings is shown which can be distinguished from each other clearly.

The lengths of the magnetic areas and gap areas of the codings a, b, c are chosen in such a way in this example that the double period length of the coding a corresponds to the period lengths of the codings b and c. For production-technical reasons it is particularly expedient to chose the periods within one group of magnetic codings in such a way that an integral multiple of the period length of a coding respectively corresponds to an integral multiple of the period length of the further codings.

In the following table the correlations between the codings a, b, c or the corresponding length conditions a, b, c and the number of adjacent high bits and the number of adjacent low bits accessible with the aid of the magnet sensor are compiled:

| Coding/Length condition | Number of adjacent low bits | Number of adjacent high bits |
|---|---|---|
| a/a | 1 or 2 | 1 or 2 |
| b/b | 1 or 2 | 3, 4 or more |
| c/c | 3, 4 or more | 1, 2 or more |

On the basis of the number of adjacent low bits and the number of adjacent high bits the coding a, b or c can be determined unambiguously.

In FIG. 2*b* three further security elements 2*d*, 2*e*, 2*f* are shown. Of the coding d belonging to the security element 2*d* three periods are shown, of the codings e, f belonging to the security elements 2*e*, 2*f* two periods respectively. Analogously to the codings a, b, c also the codings d, e, f each have a periodical arrangement of gap areas (hatched) and magnetic areas (black), wherein the period for each coding d, e, f consists of a gap area of a first length L1 (which fulfills one of the length conditions d, e or f) and a magnetic area of a second length L2 (which fulfills the same length condition d, e or f as L1). For the case shown by way of example, in which the edges of the security elements 2*d*, 2*e*, 2*f* are chosen along the lines I and II, the security elements 2*d*, 2*e*, 2*f* each have a complete gap area on the left edge. On the right edge the security elements 2*d* and 2*e* each have a cut-off magnetic area and the security element 2*f* a cut-off gap area. With the codings d, e, fin FIG. 2*b* an alternative group of codings is shown, which can be distinguished from each other clearly. In this example the lengths of the magnetic areas and gap areas of the codings d, e, f are chosen in such a way that the double period length of the coding d corresponds to the period lengths of the codings e and f.

For the alternative group of codings d, e, f the following correlations result:

| Coding/Length condition | Number of adjacent low bits | Number of adjacent high bits |
|---|---|---|
| d/d | 1 or 2 | 1, 2 or 3 |
| e/e | 1 or 2 | 4, 5 or more |
| f/f | 3, 4 or more | 1, 2 or more |

On the basis of the number of adjacent low bits and the number of adjacent high bits the coding d, e or f can be determined unambiguously.

In FIG. 2*c* two further security elements 2*g*, 2*h* are shown. Of the coding g belonging to the security element 2*g* three periods are shown, of the coding h belonging to the security element 2*h* two periods. The codings g, h each have a periodical arrangement of gap areas (hatched) and magnetic areas (black), wherein the period for each coding g, h consists of a gap area of a first length L1 (which fulfills one of the length conditions g or h) and a magnetic area of a second length L2 (which fulfills the same length condition g or h as L1). For the case shown by way of example, in which the edges of the security elements 2*g*, 2*h* are chosen along the lines I and II, the security elements 2*g*, 2*h* each have a complete gap area on the left edge. On the right edge the security element 2*g* has a cut-off gap area and the security element 2*h* a cut-off magnetic area. With the codings g, b in FIG. 2*c* a further alternative group of codings is shown, which can be distinguished from each other unambiguously. The period lengths of the codings g, h are different in this example.

For the further group of codings g, h the following correlations result:

| Coding/Length condition | Number of adjacent low bits | Number of adjacent high bits |
|---|---|---|
| g/g | 2 or 3 | 1 or 2 |
| h/h | 2 or 3 | 3, 4 or more |

On the basis of the number of adjacent low bits and the number of adjacent high bits the coding g or h can be determined clearly.

In FIG. 2*d* two further security elements 2*i*, 2*j* are shown. Of the codings i, j belonging to the security elements 2*i*, 2*j* two periods are shown respectively. The codings i, j each have a periodical arrangement of gap areas (hatched) and magnetic areas (black), wherein the period for each coding i, j, consists of a gap area of a first length L1 (which fulfills one of the length conditions i or j) and a magnetic area of a second length L2 (which fulfills the same length condition i or j as L1). For the case shown by way of example, in which the edges of the security elements 2*i*, 2*j* are chosen along the lines I and II, the security elements 21, 2*j* each have a complete gap area on the left edge. On the right edge the security element 2*i* has a cut-off magnetic area and the security element 2*j* a complete gap area. With the codings i, j in FIG. 2*d* a further alternative group of codings is shown, which can be distinguished from each other unambiguously. The period lengths of the codings i, j are different in this example.

For the further group of codings i, j, the following correlations result:

| Coding/Length condition | Number of adjacent low bits | Number of adjacent high bits |
|---|---|---|
| i/i | 2 or 3 | 1, 2 or 3 |
| j/j | 2 or 3 | 4, 5 or more |

On the basis of the number of adjacent low bits and the number of adjacent high bits the coding i or j can be determined unambiguously.

A special embodiment of a security element with the coding e is shown in FIG. 2*e* with the security element 2*e*'. The magnetic area 3, in which an interruption 11 is arranged, and the gap area 4 form an exemplary period for the coding e. On each of the two edges of the security element 2*e*' a cut-off gap area 4 is present. The magnetic area 3 in this example has a length L2 of approximately 3.4s, the gap area 4 has a length L1 of approximately 2.25s and the interruptions 11 have a length of approximately 0.65s. Within the gap areas 4 and the interruptions 11 digits, characters and symbols are arranged, containing information about the document of value comprising the security element 2*e*'. The mentioned elements can for example be formed through recesses in the layer 4, which is for example implemented as an opaque metal layer.

In FIG. 3*a* an embodiment of a bank note 1 is shown which has a security element 2*b* by way of example. Along its longitudinal direction the security element has a portion of a coding with two magnetic areas 3 and two gap areas 4. Therein the security element 2*b* at least partially is embedded in the substrate of the bank note 1, so that the security element 2, which is e.g. a window security thread, is visible only in windows 7. However, the security element 2*b* can also be completely embedded in the substrate of the bank note 1. In both cases magnetic signals can be detected.

Some preferred embodiments are explained in more detail with reference to the FIGS. 3 *b-c*, which show the bank note 1 in cross section along the dash-dotted line A-A, so as to illustrate the structure of the security element 2*b*. According to FIG. 3*b* a security element 2*b* with a layer of magnetic areas 3 and gap areas 4 is integrated in or applied on the paper substrate or plastic substrate of the bank note 1.

In the figures of the present application the inventive security element is shown schematically only. The number, arrangement and length of the magnetic areas and gap areas along the security element are essential in the inventive security element. In order to show the magnetic areas and gap areas of the inventive security element more clearly, the figures do without the representation of further layers of the inventive security element. The actual implementation of the layer structure can be carried out according to the production methods known from the state of the art. It is thus for example known from WO 92/11142 A1 to build up a security thread from several layers. Therein e.g. bars of a magnetic material can be applied on a metal layer, cf. FIGS. 2 and 3 of this publication. The magnetic material can also be arranged within the layer structure, cf. the cross sections of the security threads of FIGS. 5 to 8 of this publication. The layer structure of the inventive security element can be e.g. implemented in the manner described in WO 92/11142 A1.

With certain embodiments, e.g. security elements which when used are subject to a heavy mechanical or chemical load, it is expedient to cover the layer of magnetic areas 3 and gap areas 4 with a protective layer 6. The protective layer 6 can be a foil laminated over the security element 2*b* or a protective lacquer layer. Therein the protective lacquer layer can be applied all-over or in partial areas. For this purpose e.g. UV lacquers, hybrid lacquers, oil-print lacquers or dispersion lacquers of the one- or two-component type can be used. The protective lacquer layer preferably is printed, e.g. by flexographic printing or offset printing.

The security element 2*b* can also be arranged on a plastic foil 5, which can be applied on the bank note 1 or integrated in the bank note 1, cf. FIG. 3*c*. The plastic foil 5, on which a layer of magnetic areas 3 and gap areas 4 is arranged, can for example be glued onto the bank note 1. For the protection of the layer of magnetic areas 3 and gap areas 4 these can be covered with a protective layer 6. Deviating therefrom in and/or on the plastic foil 5 a layer of magnetic areas 3 and gap areas 4 can be applied, on which finally an adhesive layer (not shown) is applied, by means of which the security element 2*b* is fastened to the bank note 1. In this case an additional protective layer can be omitted, since a protective cover of the security element is provided by the plastic foil 5. In comparison to the representation in FIG. 3*c* this results in a reverse order of the security element 2*b* and the plastic foil 5.

In all cases described above, the adhesive can also be applied onto the bank note 1, instead of onto the security element 2*b*, in order to fasten the security element 2*b* to the bank note 1. As described above the security element 2*b* can be produced directly on the bank note 1 or provided as a separate security element 2*b* and fastened to the bank note 1. But it can also be provided to provide a separate security element 2*b*, whose structure is only completed after the security element 2 has been fastened to the bank note 1, e.g. is provided with a protection layer.

For detecting the inventive magnetic coding also other measuring geometries are suitable in addition to the implementation explained here, in which the measuring tracks 8 of the magnet sensor 10 are arranged approximately perpendicularly to the transport direction of the bank note 1. For example the measuring tracks of the magnet sensor can also be arranged obliquely to the transport direction of the bank notes, for example at an angle of 45° thereto.

In an alternative implementation the measuring tracks of the magnet sensor can also be arranged approximately parallel to the transport direction of the bank notes 1 instead. For detecting the coding in this case the magnetic signals of that/those measuring track(s) within whose detection range the security element is transported past, have to be detected at a temporal resolution corresponding to the transport speed of the bank note.

The invention claimed is:

1. A method for distinguishing between documents of value, the method comprising the steps:

providing a first document of value with at least a first security element, the first security element being configured to protect the first document of value and to be detected by means of a magnet sensor having several measuring tracks with a respective track width (s), wherein the magnet sensor detects for the number of high or low bits in magnetic coding, the first security element including at least one portion of at least one first magnetic coding having approximately the length of the first security element, wherein the first magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predeterminded direction has a first length (L1) and at least one of the magnetic areas in the predetermined direction has a second length (L2), wherein the first and second lengths (L1, L2) of the first magnetic coding fulfill at least one first of the following length conditions (a), (b), and (c):

(a) $1.8s<L1<3s$ and $0<L2<s$, wherein any first length (L1) of length condition (a) correlates to one low bit or two adjacent low bits and any second length (L2) of length condition (a) correlates to one high bit or two adjacent high bits, (b) $1.8s<L1<3s$ and $2s<L2$, wherein any first length (L1) of length condition (b) correlates to one low bit or two adjacent low bits and any second length (L2) of length condition (b) correlates to three or more adjacent high bits, and (c) $3.8s<L1$ and $0<L2$, wherein any first length (L1) of length condition (c) correlates to three or more adjacent low bits and any second length (L2) of length condition (c) correlates to one high bit or two or more adjacent high bits;

providing a second document of value with at least a second security element, the second security element being configured to protect the second document of value and to be detected by means of the magnet sensor, the second security element including at least one portion of at least one second magnetic coding having approximately the length of the second security element, wherein the second magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the second magnetic coding fulfill at least one second of the above length conditions (a), (b), and (c), the one first of the length conditions (a), (b), and (c) being different from the one second of the length conditions (a), (b), and (c);

transporting the first or the second document of value past the magnet sensor and detecting first or second magnetic signals generated by the first or second security element, respectively, with the aid of the magnet sensor;

determining the magnetic coding of the security element of the transported first or second document of value on the basis of the detected magnetic signals, wherein, if the transported document of value is the first document of value, the first magnetic coding is determined on the basis of the first magnetic signals of the first security element, and, if the transported document of value is the second document of value, the second magnetic coding is determined on the basis of the second magnetic signals of the second security element; and distinguishing between the first document of value and the second document of value based on the determined first or second magnetic coding, respectively.

2. The method according to claim 1, wherein in transporting the first document of value past the magnet sensor and transporting the second document of value past the magnet sensor, the first and second documents of value are transported approximately parallel, obliquely, or approximately perpendicularly to the predetermined direction.

3. The method according to claim 1, wherein determining the magnetic coding of the security element of the transported first or second document of value includes calculating for the first or second security element how many adjacent magnetic tracks of the magnet sensor detect one or several magnetic signals, and how many adjacent magnetic tracks do not detect any magnetic signal.

4. The method according to claim 3, wherein the first or second magnetic coding is determined on the basis of the number of adjacent magnetic tracks of the magnet sensor detecting one or several magnetic signals and the number of adjacent magnetic tracks not detecting any magnetic signal.

5. The method according to claim 1, further comprising:

providing a third document of value with at least a third security element, the third security element being configured to protect the third document of value and to be detected by means of the magnet sensor, the third security element including at least one portion of at least one third magnetic coding having approximately the length of the third security element, wherein the third magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the third magnetic coding fulfill at least one third of the above length conditions (a), (b), and (c), the one first of the length conditions (a), (b), and (c) and the one second of the length conditions (a), (b), and (c) being different from the one third of the length conditions (a), (b), and (c).

6. The method according to claim 5, wherein the step of transporting includes transporting the first, second, or third document of value past the magnet sensor and detecting first, second, or third magnetic signals generated by the first, second, or third security element, respectively, with the aid of the magnet sensor;

the step of determining includes determining the magnetic coding of the security element of the transported first, second, or third document of value on the basis of the detected magnetic signals, wherein, if the transported document of value is the third document of value, the third magnetic coding is determined on the basis of the third magnetic signals of the third security element; and the step of distinguishing includes distinguishing between the first, second, and third document of value based on the determined first, second, or third magnetic coding, respectively.

7. The method according to claim 6, wherein determining the magnetic coding of the security element of the transported first, second, or third document of value includes calculating for the first, second, or third security element how many adjacent magnetic tracks of the magnet sensor detect one or several magnetic signals, and how many adjacent magnetic tracks do not detect any magnetic signal.

8. The method according to claim 7, wherein the first, second, or third magnetic coding is determined on the basis of the number of adjacent magnetic tracks of the magnet sensor detecting one or several magnetic signals and the number of adjacent magnetic tracks not detecting any magnetic signal.

9. A method for distinguishing between documents of value, the method comprising the steps:

providing a first document of value with at least a first security element, the first security element being configured to protect the first document of value and to be detected by means of a magnet sensor having several measuring tracks with a respective track width (s), wherein the magnet sensor detects for the number of high or low bits in magnetic coding, the first security element including at least one portion of at least one first magnetic coding having approximately the length of the first security element, wherein the first magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the first magnetic coding fulfill at least one first of the following length conditions (d), (e), and (f):

d) $1.8s<L1<3s$ and $0<L2<2s$, wherein any first length (L1) of length condition (d) correlates to one low bit or two adjacent low bits and any second length (L2) of length condition (d) correlates to one high bit or two or three adjacent high bits, e) $1.8s<L1<3s$ and $3s<L2$, wherein any first length (L1) of length condition (e) correlates to one low bit or two adjacent low bits and any second length (L2) of length condition (e) correlates to four or more adjacent high bits, and f) 3.8s<L1 and 0<L2, wherein any first length (L1) of length condition (f) correlates to three or more adjacent low bits and any second length (L2) of length condition (f) correlates to one high bit or two or more adjacent high bits;

providing a second document of value with at least a second security element, the second security element being configured to protect the second document of value and to be detected by means of the magnet sensor, the second security element including at least one portion of at least one second magnetic coding having approximately the length of the second security element, wherein the second magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the second magnetic coding fulfill at least one second of the above length conditions (d), (e), and (f), the one first of the length conditions (d), (e), and (f) being different from the one second of the length conditions (d), (e), and (f);

transporting the first or the second document of value past the magnet sensor and detecting first or second magnetic signals generated by the first or second security element, respectively, with the aid of the magnet sensor;

determining the magnetic coding of the security element of the transported first or second document of value on the basis of the detected magnetic signals, wherein, if the transported document of value is the first document of value, the first magnetic coding is determined on the basis of the first magnetic signals of the first security element, and, if the transported document of value is the second document of value, the second magnetic coding is determined on the basis of the second magnetic signals of the second security element; and distinguishing between the first document of value and the second document of value based on the determined first or second magnetic coding, respectively.

10. The method according to claim 9, wherein determining the magnetic coding of the security element of the transported first or second document of value includes calculating for the first or second security element how many adjacent magnetic tracks of the magnet sensor detect one or several magnetic signals, and how many adjacent magnetic tracks do not detect any magnetic signal.

11. The method according to claim 10, wherein the first or second magnetic coding is determined on the basis of the number of adjacent magnetic tracks of the magnet sensor detecting one or several magnetic signals and the number of adjacent magnetic tracks not detecting any magnetic signal.

12. The method according to claim 9, further comprising:

providing a third document of value with at least a third security element, the third security element being configured to protect the third document of value and to be detected by means of the magnet sensor, the third security element including at least one portion of at least one third magnetic coding having approximately the length of the third security element, wherein the third magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the third magnetic coding fulfill at least one third of the above length conditions (d), (e), and (f), the one first of the length conditions (d), (e), and (f) and the one second of the length conditions (d), (e), and (f) being different from the one third of the length conditions (d), (e), and (f).

13. The method according to claim 12, wherein the step of transporting includes transporting the first, second, or third document of value past the magnet sensor and detecting first, second, or third magnetic signals generated by the first, second, or third security element, respectively, with the aid of the magnet sensor;

the step of determining includes determining the magnetic coding of the security element of the transported first, second, or third document of value on the basis of the detected magnetic signals, wherein, if the transported document of value is the third document of value, the third magnetic coding is determined on the basis of the third magnetic signals of the third security element; and the step of distinguishing includes distinguishing between the first, second, and third document of value based on the determined first, second, or third magnetic coding, respectively.

14. The method according to claim 13, wherein determining the magnetic coding of the security element of the transported first, second, or third document of value includes calculating for the first, second, or third security element how many adjacent magnetic tracks of the magnet sensor detect one or several magnetic signals, and how many adjacent magnetic tracks do not detect any magnetic signal.

15. The method according to claim 14, wherein the first, second, or third magnetic coding is determined on the basis of the number of adjacent magnetic tracks of the magnet sensor detecting one or several magnetic signals and the number of adjacent magnetic tracks not detecting any magnetic signal.

16. A method for distinguishing between documents of value, the method comprising the steps:

providing a first document of value with at least a first security element, the first security element being configured to protect the first document of value and to be detected by means of a magnet sensor having several measuring tracks with a respective track width (s), wherein the magnet sensor detects for the number of high or low bits in magnetic coding, the first security element including at least one portion of at least one first magnetic coding having approximately the length of the first security element, wherein the first magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the first magnetic coding fulfill at least one first of the following length conditions (g) and (h):

g) $2.8s<L1<4s$ and $0<L2<s$, wherein any first length (L1) of length condition (g) correlates to two or three adjacent low bits and any second length (L2) of length condition (g) correlates to one high bit or two adjacent high bits, and h) $2.8s<L1<4s$ and $2s<L2$, wherein any first length (L1) of length condition (h) correlates to two or three adjacent low bits and any second length (L2) of length condition (h) correlates to three or more adjacent high bits;

providing a second document of value with at least a second security element, the second security element being configured to protect the second document of value and to be detected by means of the magnet sensor, the second security element including at least one portion of at least one second magnetic coding having approximately the length of the second security element, wherein the second magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the second magnetic coding fulfill at least one second of the above length conditions (g) and (h), the one first of the length conditions (g) and (h) being different from the one second of the length conditions (g) and (h);

transporting the first or the second document of value past the magnet sensor and detecting first or second magnetic signals generated by the first or second security element, respectively, with the aid of the magnet sensor;

determining the magnetic coding of the security element of the transported first or second document of value on the basis of the detected magnetic signals, wherein, if the transported document of value is the first document of value, the first magnetic coding is determined on the basis of the first magnetic signals of the first security element, and, if the transported document of value is the second document of value, the second magnetic coding is determined on the basis of the second magnetic signals of the second security element; and distinguishing between the first document of value and the second document of value based on the determined first or second magnetic coding, respectively.

17. The method according to claim 16, wherein determining the magnetic coding of the security element of the transported first or second document of value includes calculating for the first or second security element how many adjacent magnetic tracks of the magnet sensor detect one or several magnetic signals, and how many adjacent magnetic tracks do not detect any magnetic signal.

18. The method according to claim 17, wherein the first or second magnetic coding is determined on the basis of the number of adjacent magnetic tracks of the magnet sensor detecting one or several magnetic signals and the number of adjacent magnetic tracks not detecting any magnetic signal.

19. A method for distinguishing between documents of value, the method comprising the steps:

providing a first document of value with at least a first security element, the first security element being configured to protect the first document of value and to be detected by means of a magnet sensor having several measuring tracks with a respective track width (s), wherein the magnet sensor detects for the number of high or low bits in magnetic coding, the first security element including at least one portion of at least one first magnetic coding having approximately the length of the first security element, wherein the first magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the first magnetic coding fulfill at least one first of the following length conditions (i) and (j):

i) $2.8s<L1<4s$ and $0<L2<2s$, wherein any first length (L1) of length condition (i) correlates to two or three adjacent low bits and any second length (L2) of length condition (i) correlates to one high bit or two or three adjacent high bits, and j) $2.8s<L1<4s$ and $3s<L2$, wherein any first length (L1) of length condition (j) correlates to two or three adjacent low bits and any second length (L2) of length condition (j) correlates to four or more adjacent high bits;

providing a second document of value with at least a second security element, the second security element being configured to protect the second document of value and to be detected by means of the magnet sensor, the second security element including at least one portion of at least one second magnetic coding having approximately the length of the second security element, wherein the second magnetic coding has magnetic areas containing magnetic material and gap areas not containing any magnetic material, or having a lower remanent flux density than the magnetic areas, wherein the magnetic areas and the gap areas are arranged along a predetermined direction, and at least one of the gap areas in the predetermined direction has a first length (L1) and at least one of the magnetic areas in the predetermined direction has a second length (L2), wherein the first and second lengths (L1, L2) of the second magnetic coding fulfill at least one second of the above length conditions (i) and (j), the one first of the length conditions (i) and (j) being different from the one second of the length conditions (i) and (j);

transporting the first or the second document of value past the magnet sensor and detecting first or second magnetic signals generated by the first or second security element, respectively, with the aid of the magnet sensor;

determining the magnetic coding of the security element of the transported first or second document of value on the basis of the detected magnetic signals, wherein, if the transported document of value is the first document of value, the first magnetic coding is determined on the basis of the first magnetic signals of the first security element, and, if the transported document of value is the second document of value, the second magnetic coding is determined on the basis of the second magnetic signals of the second security element; and distinguishing between the first document of value and the second document of value based on the determined first or second magnetic coding, respectively.

20. The method according to claim 19, wherein determining the magnetic coding of the security element of the transported first or second document of value includes calculating for the first or second security element how many adjacent magnetic tracks of the magnet sensor detect one or several magnetic signals, and how many adjacent magnetic tracks do not detect any magnetic signal.

21. The method according to claim 20, wherein the first or second magnetic coding is determined on the basis of the number of adjacent magnetic tracks of the magnet sensor detecting one or several magnetic signals and the number of adjacent magnetic tracks not detecting any magnetic signal.

* * * * *